(12) United States Patent
Paasovaara

(10) Patent No.: US 8,756,527 B2
(45) Date of Patent: Jun. 17, 2014

(54) METHOD, APPARATUS AND COMPUTER PROGRAM PRODUCT FOR PROVIDING A WORD INPUT MECHANISM

(75) Inventor: Susanna Paasovaara, Lempaala (FI)

(73) Assignee: RPX Corporation, San Francisco, CA (US)

( * ) Notice: Subject to any disclaimer, the term of this patent is extended or adjusted under 35 U.S.C. 154(b) by 1177 days.

(21) Appl. No.: 12/016,383

(22) Filed: Jan. 18, 2008

(65) Prior Publication Data
US 2009/0187846 A1 Jul. 23, 2009

(51) Int. Cl.
G06F 3/048 (2013.01)
G06F 3/023 (2006.01)
G06F 17/27 (2006.01)
G06F 17/30 (2006.01)
G06F 3/0488 (2013.01)
H04M 1/725 (2006.01)
G06K 9/72 (2006.01)

(52) U.S. Cl.
CPC ............ *G06F 3/0237* (2013.01); *G06F 17/276* (2013.01); *G06F 17/30716* (2013.01); *G06F 3/04886* (2013.01); *G06F 3/0233* (2013.01); *G06F 17/30867* (2013.01); *G06F 17/3061* (2013.01); *G06F 17/30* (2013.01); *H04M 2250/70* (2013.01); *H04M 1/72552* (2013.01); *G06K 9/72* (2013.01)
USPC ............ 715/816; 715/773; 715/810; 715/825

(58) Field of Classification Search
CPC . G06F 3/0237; G06F 3/04886; G06F 3/0233; G06F 17/276; G06F 17/30867; G06F 17/3061; G06F 17/30; G06F 17/30716; H04M 2250/70; H04M 1/72552; G06K 9/72
USPC .......................... 715/780, 816, 773, 810, 825
See application file for complete search history.

(56) References Cited

U.S. PATENT DOCUMENTS

| | | | | |
|---|---|---|---|---|
| 4,863,296 | A * | 9/1989 | Yamakawa et al. | 400/63 |
| 6,931,604 | B2 * | 8/2005 | Lane | 715/853 |
| 6,964,018 | B1 * | 11/2005 | Masui | 715/259 |
| 7,480,669 | B2 * | 1/2009 | Lo et al. | 1/1 |
| 7,653,605 | B1 * | 1/2010 | Jackson | 706/20 |
| 7,681,124 | B2 * | 3/2010 | Gunn et al. | 715/256 |
| 7,809,548 | B2 * | 10/2010 | Mihalcea et al. | 704/1 |
| 7,912,700 | B2 * | 3/2011 | Bower et al. | 704/9 |
| 2002/0072394 | A1 * | 6/2002 | Muramatsu | 455/566 |
| 2003/0212674 | A1 * | 11/2003 | Nakagawa | 707/3 |
| 2005/0017954 | A1 * | 1/2005 | Kay et al. | 345/169 |
| 2005/0050469 | A1 * | 3/2005 | Uchimoto et al. | 715/531 |
| 2005/0114770 | A1 * | 5/2005 | Sacher et al. | 715/534 |
| 2005/0171760 | A1 * | 8/2005 | Tinkler | 704/10 |
| 2005/0188296 | A1 * | 8/2005 | Masui | 715/500 |
| 2005/0283358 | A1 * | 12/2005 | Stephanick et al. | 704/7 |

(Continued)

*Primary Examiner* — Patrick Riegler
(74) *Attorney, Agent, or Firm* — Howison & Arnott, L.L.P.

(57) ABSTRACT

An apparatus for providing a word input mechanism may include a processing element. The processing element may be configured to determine a plurality of candidate words available for selection based on context information, provide for a display of the plurality of candidate words in a candidate word field, receive a selection of at least one of the candidate words, and include a selected candidate word in a text entry.

22 Claims, 6 Drawing Sheets

(56) References Cited

U.S. PATENT DOCUMENTS

| | | | |
|---|---|---|---|
| 2006/0165289 A1* | 7/2006 | Boss et al. | 382/182 |
| 2006/0265648 A1* | 11/2006 | Rainisto et al. | 715/534 |
| 2007/0011012 A1* | 1/2007 | Yurick et al. | 704/277 |
| 2007/0074131 A1* | 3/2007 | Assadollahi | 715/816 |
| 2008/0154828 A1* | 6/2008 | Antebi et al. | 706/46 |
| 2008/0167872 A1* | 7/2008 | Okimoto et al. | 704/251 |
| 2009/0109067 A1* | 4/2009 | Burstrom | 341/22 |
| 2009/0182727 A1* | 7/2009 | Majko | 707/5 |

* cited by examiner

METHOD, APPARATUS AND COMPUTER PROGRAM PRODUCT FOR PROVIDING A WORD INPUT MECHANISM

TECHNOLOGICAL FIELD

Embodiments of the present invention relate generally to user interface technology and, more particularly, relate to a method, apparatus and computer program product for providing a word input mechanism such as, for example, a word input cloud.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, web browsing, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, etc.

In many situations, it may be desirable for the user to interface with a device such as a mobile terminal for the provision of an application or service. As such, a user interface may be provided to enable receipt of user input at the device and provision of output to the user. The user interface may be utilized for text input, for selection of commands, options, hotspots, etc., and for numerous other functions. A typical user interface may include a keyboard including keys that may be pressed or selected in order to provide character entry. The keyboard may be physically embodied, for example, as a plurality of keys having a predefined function associated therewith, or may be embodied in software (e.g., via a touch screen or a keyboard rendered on a display with keys selectable by mouse or scrolling device). A user's experience during certain applications may be enhanced by using a touch screen display or a rendered keyboard as the user interface. Furthermore, some users may have a preference for use of a touch screen display or rendered keyboard for entry of user interface commands over other alternatives. In recognition of the utility and popularity of touch screen displays and rendered keyboards, many devices, including some mobile terminals, now employ such interfaces.

Touch screen devices are now relatively well known in the art, with numerous different technologies being employed for sensing a particular point at which an object may contact or even approach the touch screen display. In an exemplary situation, pressure detection may be sensed over a relatively small area and the detection of such pressure may be recognized as a selection of an object, link, item, hotspot, etc. associated with the location of the detection of the pressure. Other mechanisms are also available including, for example, capacitive sensing which may be able to detect an object approaching the touch screen display. Accordingly, although we will refer herein to a touch screen display, it should be recognized that it is not necessary in all cases for a physical touch of the screen to occur in order to register an input as a touch event. Moreover, a touch screen may be employed in conjunction with a stylus, a pen, pencil or other pointing device that may be substituted for a dedicated instrument to function as a stylus (e.g., a finger). Such devices may be advantageous since they provide a relatively precise mechanism by which to apply pressure that may be detected over a corresponding relatively small area and can therefore be recognized as indicative of a user's intent to select a corresponding object, link, item, hotspot, etc.

However, regardless of whether a touch screen, rendered keyboard or physical keyboard is utilized, for certain electronic devices in which the size of the device may be limited for practical or personal reasons, it may be difficult to provide text entry in an efficient or expeditious manner. Accordingly, it may be desirable to provide a mechanism for overcoming at least some of the disadvantages discussed above.

BRIEF SUMMARY

A method, apparatus and computer program product are therefore provided to enable the provision of an improved word input mechanism. In this regard, embodiments of the present invention may provide a word input cloud that presents options for entry of entire words or character sequences to speed text input operations. In this regard, embodiments may be tailored to specific users or situations in order to provide a plurality of selectable words in a candidate word field in which the candidate words in the candidate word field are determined based on the current context. As such, for example, if a particular user employs personal or common phraseology, slang, abbreviations, emoticons, acronyms, etc., the candidate words for a given recipient, subject, application, etc., may be determined based on the user's prior decisions and selections.

Embodiments of the invention may provide a method, apparatus and computer program product for advantageous employment in mobile environments, such as on a mobile terminal capable of rendering content items related to various types of media. As a result, for example, mobile terminal users may enjoy an improved user interface capability and a corresponding improved ability to input text for communication, work product generation, instructional or other purposes.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
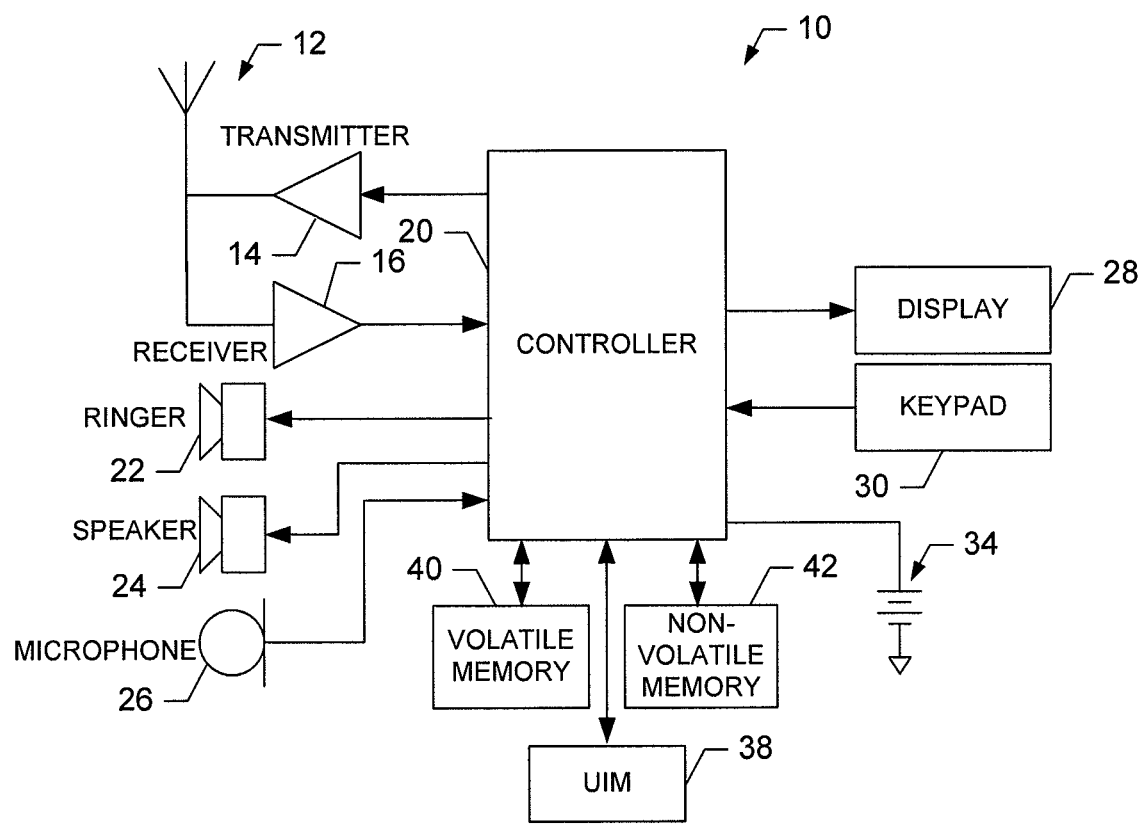
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1, one aspect of the invention, illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While several embodiments of the mobile terminal 10 are illustrated and will be hereinafter described for purposes of example, other types of mobile terminals, such as portable digital assistants (PDAs), pagers, mobile televisions, gaming devices, laptop computers, cameras, video recorders, audio/video player, radio, GPS devices, tablets, internet capable devices, or any combination of the aforementioned, and other types of voice and text communications systems, can readily employ embodiments of the present invention.

In addition, while several embodiments of the method of the present invention are performed or used by a mobile terminal 10, the method may be employed by other than a mobile terminal. Moreover, the system and method of embodiments of the present invention will be primarily described in conjunction with mobile communications applications. It should be understood, however, that the system and method of embodiments of the present invention can be utilized in conjunction with a variety of other applications, both in the mobile communications industries and outside of the mobile communications industries.

The mobile terminal 10 includes an antenna 12 (or multiple antennae) in operable communication with a transmitter 14 and a receiver 16. The mobile terminal 10 further includes an apparatus, such as a controller 20 or other processing element, that provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with fourth-generation (4G) wireless communication protocols or the like.

It is understood that the apparatus such as the controller 20 includes circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an electrically erasable programmable read only memory (EEPROM), flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10. Furthermore, the memories may store instructions for determining cell id information. Specifically, the memories may store an application program for execution by the controller 20, which determines an identity of the current cell, i.e., cell id identity or cell id information, with which the mobile terminal 10 is in communication.

Figure 2:
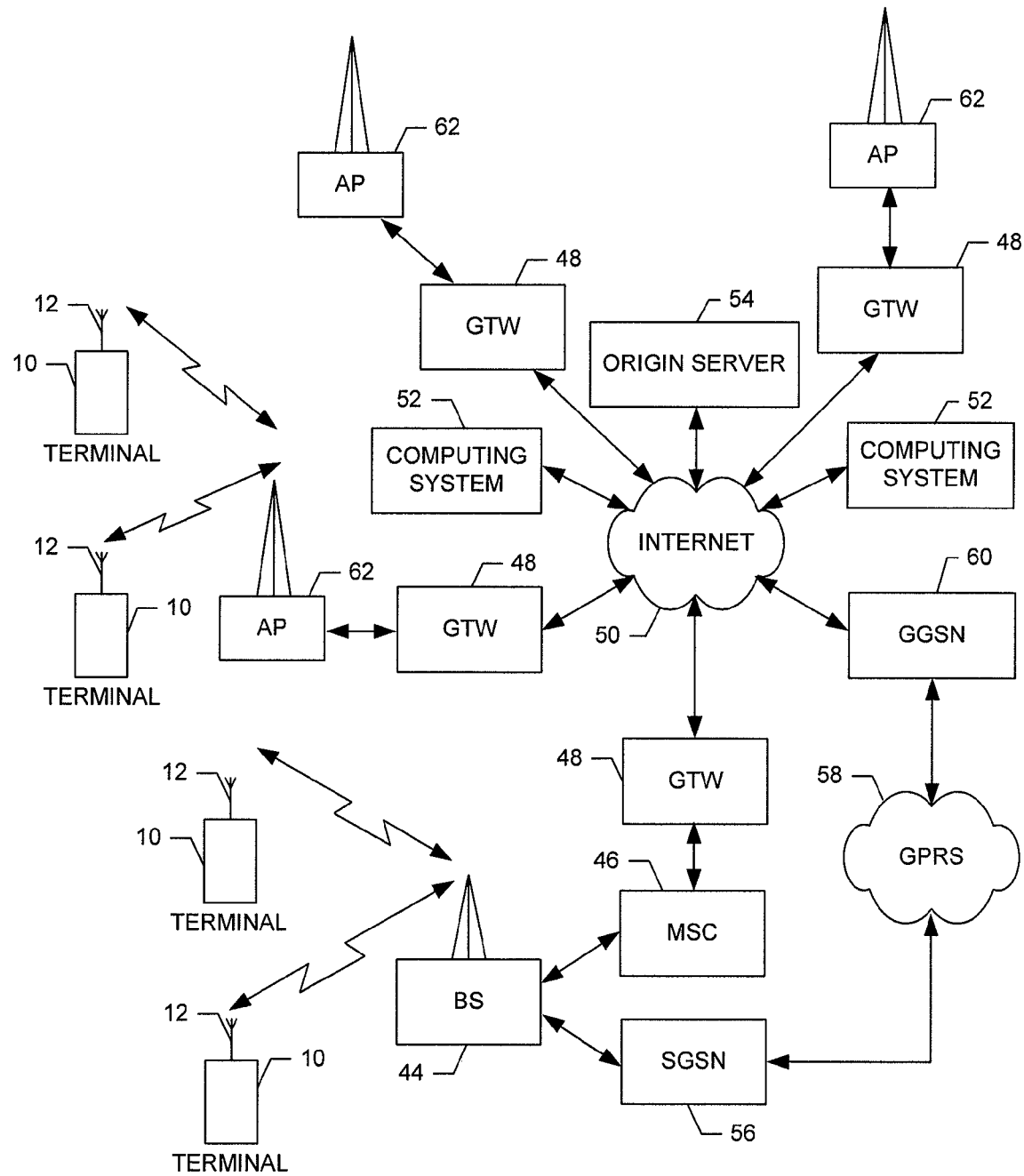
FIG. 2 is a schematic block diagram of a wireless communications system according to an exemplary embodiment of the present invention.

FIG. 2 is a schematic block diagram of a wireless communications system according to an exemplary embodiment of the present invention. Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a gateway device (GTW) 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a serving GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a gateway GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a UMTS network employing WCDMA radio access technology. Some narrow-band analog mobile phone service (NAMPS), as well as total access communication system (TACS), network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), infrared (IrDA) or any of a number of different wireless networking techniques, including wireless LAN (WLAN) techniques such as IEEE 802.11 (e.g., 802.11a, 802.11b, 802.11g, 802.11n, etc.), world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques and/or the like. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including universal serial bus (USB), LAN, WLAN, WiMAX, UWB techniques and/or the like.

In an exemplary embodiment, content or data may be communicated over the system of FIG. 2 between a mobile terminal, which may be similar to the mobile terminal 10 of FIG. 1, and a network device of the system of FIG. 2 in order to, for example, execute applications or establish communication (for example, for purposes of communication) between the mobile terminal 10 and other mobile terminals or network devices. As such, it should be understood that the system of FIG. 2 need not be employed for communication between mobile terminals or between a network device and the mobile terminal, but rather FIG. 2 is merely provided for purposes of example. Furthermore, it should be understood that embodiments of the present invention may be resident on a communication device such as the mobile terminal 10, and/or may be resident on a mobile telephone, mobile computer, gaming device, camera, laptop computer or other device, absent any communication with the system of FIG. 2.

An exemplary embodiment of the invention will now be described with reference to FIG. 3, in which certain elements of an apparatus for providing a word input mechanism are displayed. The apparatus of FIG. 3 may be employed, for example, on the mobile terminal 10 of FIG. 1. However, it should be noted that the system of FIG. 3, may also be employed on a variety of other devices, both mobile and fixed, and therefore, the present invention should not be limited to application on devices such as the mobile terminal 10 of FIG. 1. Alternatively, embodiments may be employed on a combination of devices including, for example, those listed above. Accordingly, embodiments of the present invention may be embodied wholly at a single device (e.g., the mobile terminal 10) or by devices in a client/server relationship. Furthermore, it should be noted that the devices or elements described below may not be mandatory and thus some may be omitted in certain embodiments.

Although an exemplary embodiment of the present invention described below will generally refer to word selection in relation to selection of a candidate word from a plurality of candidate words provided in a candidate word field, embodiments of the present invention more generally relate to any application in which a text entry may be provided relating to a plurality of characters comprising a recognizable communicative element. As such, whenever a text entry of characters, such as a number, letter, symbol or the like, is to be performed, embodiments of the present invention may be practiced. Accordingly, when the terms "word" or "words" are used herein, they should be understood to include character sequences that may or may not be present in a dictionary including, for example, phrases, slang, abbreviations, emoticons, acronyms, etc.

Embodiments of the present invention may involve a selection of a candidate word from among a plurality of candidate words in a candidate word field that may resemble a tag cloud (e.g., a plurality of metadata tags provided in a particular field, which may be shaped as a cloud, in a non-linear fashion). Selection of a particular candidate word may provide that the selected candidate word is included in a text field (e.g., for inclusion in a message, instruction, etc.) rendered on a display screen. The candidate words may be determined based on any of a number of factors that may provide contextual clues related to the usage of the word to be selected. Such contextual clues may be determined from the application associated with the text entry (e.g., email, short message, word processor, web browser, etc.) or even from positional (e.g., user location by GPS or other methods) or situational (e.g., frequency, user habits, type of message, other like factors or combinations of the preceding) factors related to a given application. In this regard, certain candidate words may be more likely to be used in certain situations than in others (e.g., the use of "hello" or "hi" may be a predictable opening to an email or short message) and thus, may be presented as candidate words in situations where the likelihood of their use is above a particular threshold. The user's own style and past usage of words in certain situations may also provide contextual clues that may form the basis of determining candidate words. In this regard, for example, a likelihood of various subsequent words (e.g., likely word followers) may be determined based on prior selections made by the user. Moreover, candidate words may be differentiated from each other based on the relative likelihood (e.g., probability) of each particular candidate word being the next word selected based on the previous word, a currently selected letter or sequence of letters, or other contextual clues. These and other features may be accomplished via the exemplary apparatus described below in reference to FIG. 3, which illustrates one example of an embodiment of the present invention which may be used in connection with a touch screen display. However, it should be understood that embodiments could also be employed on devices that do not employ a touch screen. In such devices selections may be made similarly except that the selection of a particular candidate word (or characters within a word) may be made using a scrolling device, mouse, or other selection mechanism.

Figure 3:
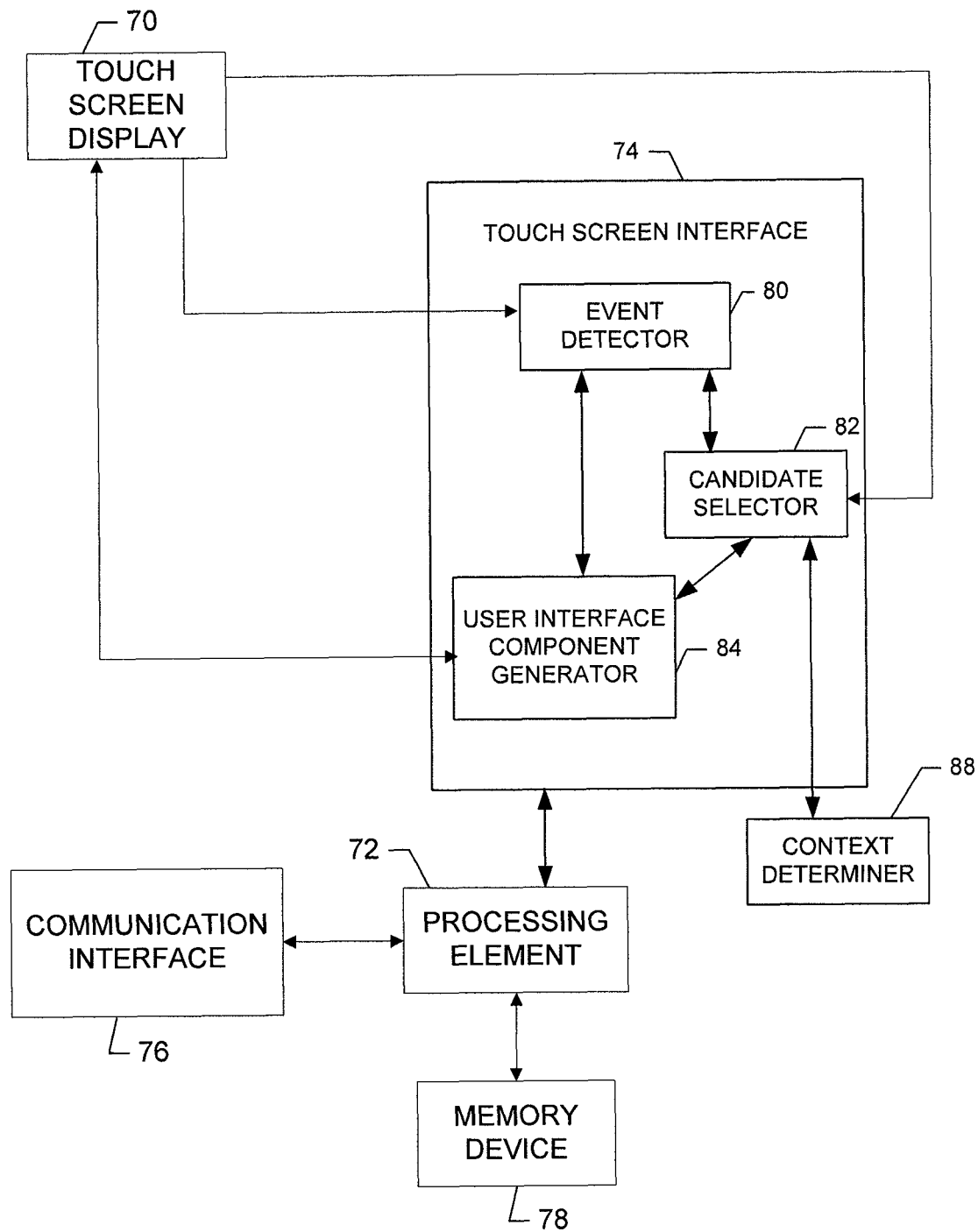
FIG. 3 is a schematic block diagram of an apparatus for providing a word input mechanism according to an exemplary embodiment of the present invention.

Referring now to FIG. 3, an apparatus for providing a word input mechanism is provided. The apparatus may include or otherwise be in communication with a touch screen display 70 (e.g., the display 28), a processing element 72 (e.g., the controller 20), a touch screen interface 74, a communication interface 76 and a memory device 78. The memory device 78 may include, for example, volatile and/or non-volatile memory (e.g., volatile memory 40 and/or non-volatile memory 42). The memory device 78 may be configured to store information, data, applications, instructions or the like for enabling the apparatus to carry out various functions in accordance with exemplary embodiments of the present invention. For example, the memory device 78 could be configured to buffer input data for processing by the processing element 72. Additionally or alternatively, the memory device 78 could be configured to store instructions for execution by the processing element 72.

The processing element 72 may be embodied in a number of different ways. For example, the processing element 72 may be embodied as a processor, a coprocessor, a controller or various other processing means or devices including integrated circuits such as, for example, an ASIC (application specific integrated circuit) or FPGA (field programmable gate array). In an exemplary embodiment, the processing element 72 may be configured to execute instructions stored in the memory device 78 or otherwise accessible to the processing element 72. Meanwhile, the communication interface 76 may be embodied as any device or means embodied in either hardware, software, or a combination of hardware and software that is configured to receive and/or transmit data from/to a network and/or any other device or module in communication with the apparatus. In this regard, the communication interface 76 may include, for example, an antenna and supporting hardware and/or software for enabling communications with a wired or wireless communication network.

The touch screen display 70 may be embodied as any known touch screen display. Thus, for example, the touch screen display 70 could be configured to enable touch recognition by any suitable technique, such as resistive, capacitive, infrared, strain gauge, surface wave, optical imaging, dispersive signal technology, acoustic pulse recognition, etc. techniques. The touch screen interface 74 may be in communication with the touch screen display 70 to receive an indication of a touch event at the touch screen display 70 and to modify a response to the indication in certain situations. In particular, the touch screen interface 74 may be configured to modify the contents of either or both of a text field and a candidate word field based on the selection of a particular character or word. In other words, the touch screen interface 74 may be configured to present a display of a word cloud (which may be similar in appearance to a tag cloud) and/or an entry field comprising the text field in which selected candidate words appear in the sequence selected for inclusion in, for example, a message, text entry, or instruction. The text characters associated with any particular candidate word could be numbers, letters, symbols, graphics, etc., in any language, style, font, size, etc.

The touch screen interface 74 may be any device or means embodied in either hardware, software, or a combination of hardware and software configured to perform the respective functions associated with the touch screen interface 74 as described herein. In an exemplary embodiment, the touch screen interface 74 may be embodied in software as instructions that are stored in the memory device 78 and executed by the processing element 72. Alternatively, touch screen interface 74 may be embodied as the processing element 72 including, for example, being embodied as instructions that are stored in the memory device 78 and executed by the processing element 72.

The touch screen interface 74 may be configured to receive an indication of an input in the form of a touch event at the touch screen display 70. As suggested above, the touch event may be defined as an actual physical contact between a selection object (e.g., a finger, stylus, pen, pencil, or other pointing device) and the touch screen display 70. Alternatively, a touch event may be defined as bringing the selection object in proximity to the touch screen display 70 (e.g., hovering over an object or approaching an object within a predefined distance). In response to detection of a touch event at the touch screen display 70, the touch screen interface 74 may modify a response to the touch event for operations involving the selection of a particular text character or word. In this regard, the touch screen interface 74 may include an event detector 80, a candidate selector 82 and a user interface component generator 84. Each of the event detector 80, the candidate selector 82 and the user interface component generator 84 may be any device or means embodied in either hardware, software, or a combination of hardware and software configured to perform the corresponding functions associated with the event detector 80, the candidate selector 82 and the user interface component generator 84, respectively, as described below. In an exemplary embodiment, each of the event detector 80, the candidate selector 82 and the user interface component generator 84 may be controlled by or otherwise embodied as the processing element 72. In some instances, the candidate selector 82 may be in communication with a context determiner 88, which may provide context information to the candidate selector 82 for use in determining candidate words as provided in greater detail below.

The context determiner 88 may be any means such as a device or circuit embodied in either hardware, software, or a combination of hardware and software configured to perform the corresponding functions associated with the context determiner 88 as described below. In this regard, the context determiner 88 (which may in some instances be embodied as a processor (e.g., the processing element 72)) may utilize various types of available information in order to provide situational awareness to the candidate selector 82. For example, the context determiner 88 may provide information regarding a currently executed application, a position within a document or message, previous entries (e.g., prior words and/or characters), time of day, date, and/or the like to the candidate selector 82. The information provided to the candidate selector 82 by the context determiner 88 may be acquired from the application being executed and/or other applications, web services or other sources.

The event detector 80 may be in communication with the touch screen display 70 to determine the occurrence of a touch event associated with a particular operation based on each input received at the event detector 80. In this regard, for example, the event detector 80 may be configured to receive an indication of a touch event and may also receive an input or otherwise be aware of a current application, operation or mode of operation of the apparatus. Accordingly, if the current application includes or invokes a text character input option, the event detector 80 may detect the touch event invoking an application related to text character entry (e.g., an email, short message, word processor, or other like applications) and communicate with the candidate selector 82 to enable or otherwise inform the candidate selector 82 to determine candidate words associated with the operation (or application).

The candidate selector 82 may be configured to determine candidate words for an application or operation based on the application or operation itself and/or based on context clues. In this regard, for example, if an application is being executed that involves text entry or if a particular application that requires, enables or is supported by embodiments of the present invention is being executed, the candidate selector 82 may determine a plurality of words for inclusion as candidate words. In some instances, the candidate selector 82 may merely select candidate words based on the application being executed. For example, if the application being executed is related to email or another type of message service, typical words used for beginning and/or ending a message may be provided as candidate words. In some cases, the typical words may be based on a particular user (e.g., the words frequently used by the user of the mobile terminal in connection with the application in past messages). However, the typical words could alternatively be generically determined based on multiple users (e.g., associated with a service provider, associated with the terminal, etc.) or merely a predetermined set of candidate words assigned to a particular application. As another example, if the text field 102 is determined to correspond to a recipient field of an email, only contact names from a contact list may be provided as candidate words. The determination of candidate words may be made from a plurality of available words from a database (e.g., the memory device 78). As such, the database may include a plurality of words that could form candidate words and the candidate selector 82 may then select the candidate words from among the available words of the database based on the context clues provided from the context determiner 88.

Figure 4:
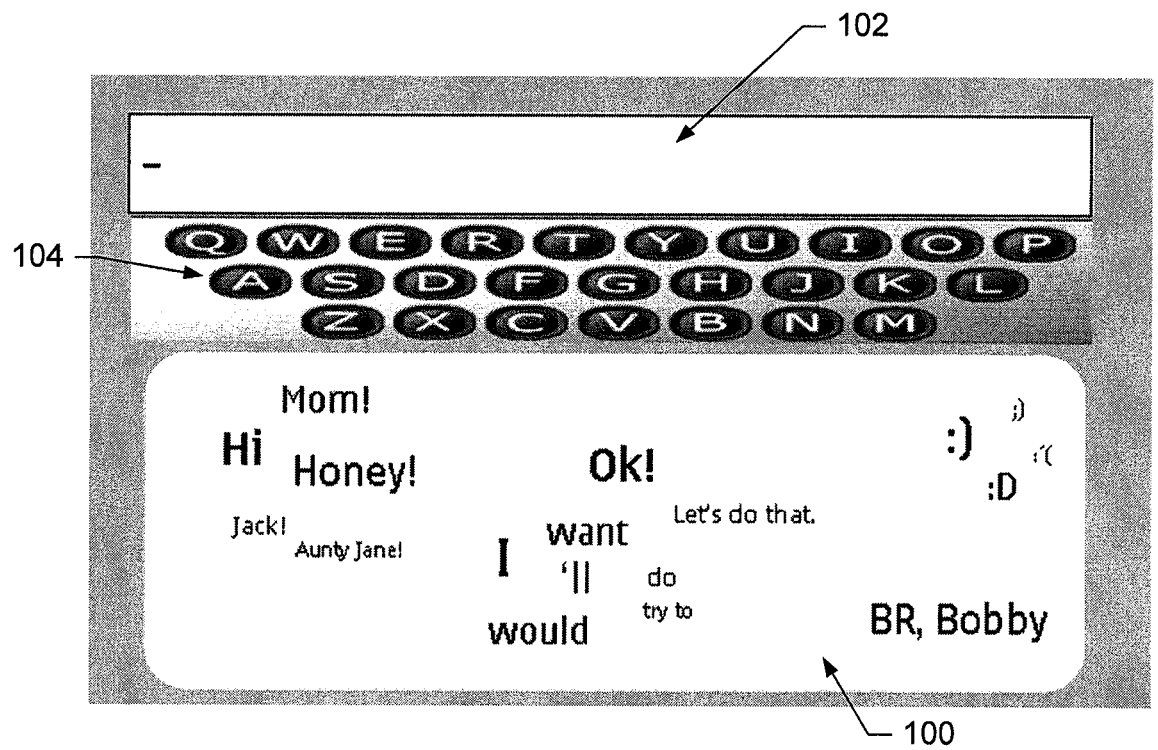
FIG. 4 shows an example of a user interface display in accordance with an exemplary embodiment of the present invention.

FIG. 4 shows an example of a user interface display in accordance with an exemplary embodiment illustrating a situation in which the candidate words are provided based on context information corresponding to the application being executed. In this regard, for example, the display may include a candidate word field 100 (e.g., a word cloud) including a plurality of candidate words and a text field 102 providing a sequential listing of selected or otherwise previously provided text entries. In some embodiments, a keyboard display 104 may also be provided in which particular keys may be selected for entry into the text field 102 in order to permit entry of words into the text field 102 or to provide context information (e.g., a starting character or characters for a particular word) that may be used to generate corresponding candidate words. Accordingly, entries to the text field 102 may be provided by selection of candidate words from the candidate word field 100 and/or by selecting letters from the keyboard display 104 to complete an entry. Entries may also be provided by speech input, text on 9 keys (T9) or other similar input mechanisms (or by combination of the above).

In some embodiments, the candidate words may be presented in a non-linear fashion such that the presentation does not merely provide a listing of candidate words, but rather a plurality of words that may be placed in locations within the candidate word field 100 that may be significant for the corresponding application or document associated therewith. For example, for a letter drafting or email related application, candidate words typically utilized as greetings may be disposed at a location within the candidate word field 100 corresponding to a beginning of a letter format and a signature block and/or other typical ending words may be disposed near the end of the letter format with other words more commonly used in the body of such communications placed in between. Alternatively, candidate words presented at any given time could be dependent upon the location or situation within the message or document currently being drafted. Thus, for example, near the beginning of the document, greeting words may be heavily represented among the candidate words, while when in the middle or end of the document, the candidate words may be dynamically updated to include words more commonly used in the body or ending of the document. A determination as to "more common" usage may be personal to the user (e.g., based on past decisions, usages and selections) or may be based on general frequency determinations not related to any particular user. As yet another alternative, words associated with a particular topic or theme may be clustered together with other words sharing the same topic or theme. Threaded messages could also be used to determine more relevant words. In this regard, for example, threads can be used in text or email programs.

Figure 5:
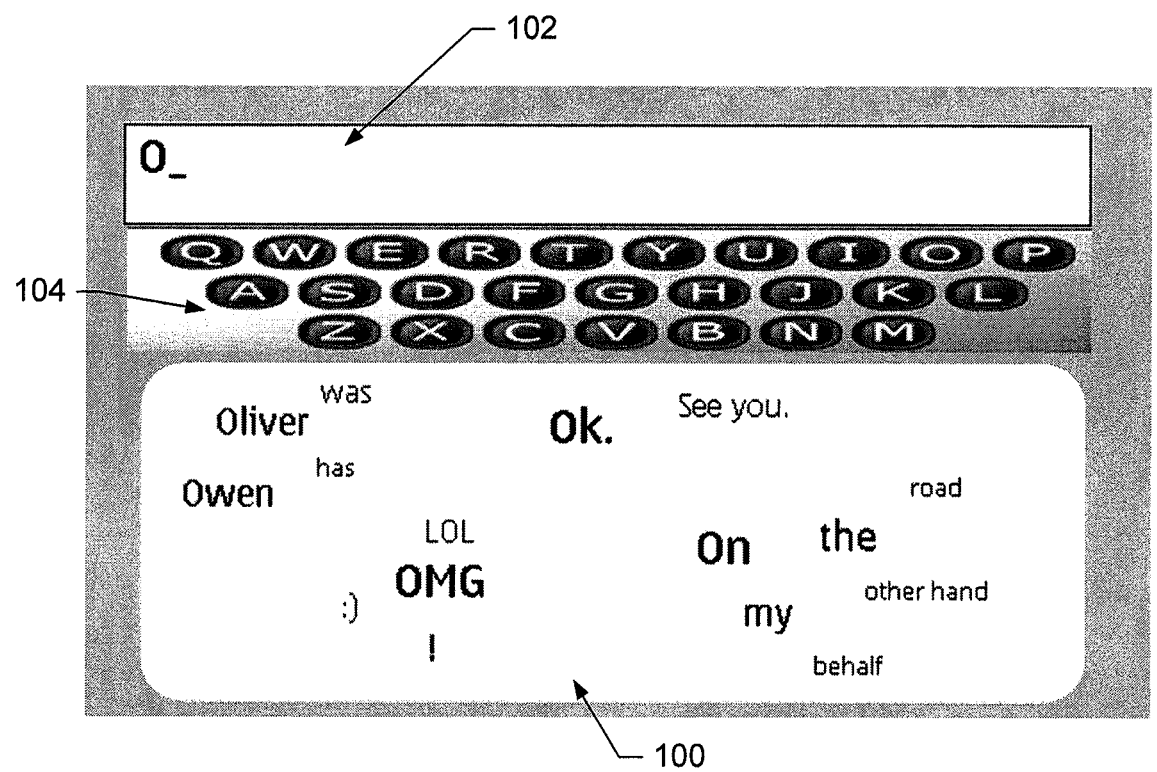
FIG. 5 shows another example of a user interface display in accordance with an exemplary embodiment of the present invention.

Updates to candidate words provided in the candidate word field 100, if made, may be accomplished by the candidate selector 82 either periodically, continuously, or in response to a particular stimulus, such as in response to receipt of an entry (e.g., selection of candidate words or entry of a text character(s) from the keyboard display 104). Updates to candidate words may include, for example, changing some or all of the candidate words provided in the candidate word field 100 or highlighting particular candidate words that may be determined to have an increased likelihood of being appropriate for use based on the current context. The context, which may be determined by the context determiner 88, may be communicated to the candidate selector 82 for use in candidate word selection as described above. Candidate words may be selected based on having a probability of being appropriate for use (e.g., the probability of being selected as determined by comparing statistics or information regarding past selection of the corresponding candidate word to a threshold). In some instances, certain candidate words having a higher probability of being appropriate for use may be differentiated from other candidate words by modifying a display characteristic of the corresponding candidate words. In other words, for example, based on a probability associated with each corresponding one of the candidate words, the font, color, size, position, presentation features (e.g., flashing, transparency, etc.) of at least one of the candidate words may be altered. For example, as shown in FIGS. 4 and 5, certain ones of the candidate words have varying sizes, which could be determined based on the probability associated with each corresponding candidate word. Candidate words having a higher probability of being selected may be considered more relevant to the current context. Candidate words having a higher relevance may be, for example, displayed nearest a particular position in the candidate word field 100 (e.g., the center) and/or having a larger size. Updating of candidate words could include changes to words and/or changes to display characteristics associated with some of the candidate words.

In some embodiments, as indicated above, updating of candidate words may be performed based on previous messages and/or documents drafted by the user. In this regard, the user's style and characteristic phrases, expressions, abbreviations, emoticons, and the like may be determined (e.g., by the context determiner 88) over time via analysis of previous operations performed by the user. Accordingly, a user profile may be determined by the context determiner 88 that may define associations between particular context situations (e.g., particular previously entered words/characters, particular time/date situations, particular applications, and the like) and corresponding word candidates that have a probability of being selected by the user.

In certain embodiments, the updating may be performed in a manner aimed at reducing a user's ability to notice (and therefore be bothered by) changes to the candidate words. For example, in one embodiment, updates to candidate words may only be accomplished by updating a portion of the candidate word field 100 that is not proximate to the selected candidate word. Thus, for example, if candidate words having similar themes are clustered, changes may occur to words that do not fit the theme from which the user is currently selecting (e.g., in order to expand the vocabulary of words associated with the theme from which current selections are coming).

In an exemplary embodiment, other context information may also be utilized for candidate word determination. In this regard, for example, other context information could be received or determined based on previous entries (e.g., the prior word or words entered, the prior character or characters entered). Thus, for example, a first character of a particular word may be entered (e.g., via the keyboard display 104) which may be used to determine possible candidate words corresponding to the first character as shown in FIG. 5. Alternatively, a listing of word follower statistics (e.g., which words commonly follow other particular words) may be utilized for context determinations. Such statistics may be compiled, for example, based on the application, the user, or combinations of the user and application. Date and time of day may also be utilized for context determination by the context determiner 88. Thus, for example, in the morning, candidate words may include greetings such as "good morning" or other time appropriate references. Similarly, in late December, holiday or New Year greetings may be included as word candidates.

As also indicated in FIG. 5, the candidate selector 82 may be further configured to determine likely follow on words for words that have been selected as likely next words for selection based on the current context. In other words, as shown in the example of FIG. 5, if the letter "O" is selected, a list of likely words beginning with the letter "O" may be presented in the candidate word field (e.g., word cloud). Since these words (i.e., the words presented that start with the letter "O") have the highest likelihood of being selected, they may be presented as candidate words having a largest font size. However, in addition to or rather than displaying other less likely candidate words (e.g., in a reducing font size corresponding to a reducing likelihood of selection), likely words to follow one or more of the candidate words beginning with the letter "O" may be provided in a reducing font size. In some cases, strings of follow on words may be provided. For example, as shown in FIG. 5, the word "on" may be provided as a candidate word. Additionally, follow-on words may be provided in case "on" is selected, such as "the" or "my" along with further follow-on words. Accordingly, a phrase such as "on the other hand" may be indicated along with one or more alternative phrases that may be commonly used with the word "on" in contexts similar to the current context. In some embodiments, the word "on" may be selected initially and the follow-on words may be prominently presented thereafter to facilitate selection thereof. However, in some embodiments, the user may select multiple words (e.g., such as all of the words in the phrase "on the other hand") using a mechanism described in greater detail below (e.g., dragging a box around or a line through a plurality of selected words). As yet another alternative, selection of the word "hand" (i.e., the last word in the phrase) may result in the entire corresponding phrase (e.g., "on the other hand") being selected.

During operation, for example, if a plurality of candidate words are being rendered on the touch screen display 70 and a touch event is detected at a particular portion of the touch screen display 70 that corresponds to initiating entry of a particular character or candidate word, the event detector 80 may communicate such occurrence to the candidate selector 82. The context determiner 88 may communicate context information to the candidate selector 82 as well. According to one example implementation, the candidate selector 82 may then determine the candidate words for the operation or application based on possible entries (e.g., according to probability) based on the context information. Once a selection has been entered, a new determination of candidate words may be determined by the candidate selector 82 based on possible subsequent words. The process may continue thereafter in similar fashion for the entry of each subsequent word until, for example, a message is complete and ready for transmission. After the candidate words are determined (or re-determined for each subsequent entry related to a particular operation) the candidate words are identified or otherwise communicated to the user interface component generator 84.

The component generation element 84 may be configured to generate a user interface component (e.g., the word cloud) which may be communicated to the touch screen display 70 for visualization at the display based on information received from the candidate selector 82. In this regard, the generated user interface component may include the candidate word field 100 and/or the text field 102 (or updated versions of either of the above). As such, the component generation element 84 may be configured to provide for a display of the word cloud comprising one or more word candidates determined by the candidate selector 82.

Selection of one or more candidate words may be received via the user interface (e.g, via the event detector 80). In this regard, for example, the user may touch (or select via other mechanisms) a selected word candidate. The selected word candidate from the candidate word field 100 may then be transferred or otherwise displayed in the text field 102 as a selected entry. Subsequent words may then also sequentially be selected (or manually entered via the keyboard display 104) until the message or document is complete. In some embodiments, if more than one word within the candidate word field 100 is desired for selection, the user may, for example, select more than one word candidate at a time. In this regard, for example, multiple words may be selected simultaneously (e.g., with use of multiple fingers) or by drawing a box around multiple words (e.g., with a click and drag operation). Alternatively, a line may be drawn (e.g., with a click and drag operation) between a plurality of words in the order in which the words are to be placed in the text field 102. Words moved to the text field 102 which are in the wrong order may be moved in position (e.g., via a drag and drop operation) to correct the order of the words. In some embodiments, there may be a mode or function key designating multiple entry operation. Accordingly, after entering multiple entry operation mode, the user may simply click on a plurality of words, each of which may be moved to the text field 102 upon selection of an entry key. In some instances, each word clicked on in multiple entry operation mode may be assigned a number indicating the order assignment for the corresponding word. The number may disappear when the entry key is selected to move the selected words, in an order corresponding to the sequence of the numbers assigned thereto, to the text field 102.

In an exemplary embodiment, the user may provide feedback to the candidate selector 82 and/or the context determiner 88 regarding a particular candidate word set provided in the candidate word field 100. In some sense, every selection of a particular word among the candidate words provided may give feedback. However, feedback may also be provided apart from selection of one of the candidate words for inclusion as a text entry. Such feedback may be used for feature determinations of candidate words that may be presented. In this regard, for example, the user may select one or more words from the candidate word field 100 for exclusion from consideration as a candidate word. Accordingly, the exclusion of such word in the current context may be used in future candidate word determinations in order to make provision of the excluded word less likely in the future. Exclusion of a particular word may be accomplished in a plurality of ways. For example, the user may drag a particular word to a "trash bin" or to a border of the candidate word field 100 in order to indicate that the word is selected for exclusion. In some embodiments, operations such as dragging a word to the border of the candidate word field 100 or selecting a word in a particular way (e.g., long press, double click, or the like) may result in the presentation of an option menu or list of available functions related to the word. The option menu or list of available functions may, for example, enable the user to provide an alternate spelling, define follow-on words, select an acronym or synonym to be presented instead of or in addition to the word, delete the word as a candidate word (one time or forever), or the like. As other alternatives, selecting a word in a particular way may cause, for example, rotation of similar words or different word forms or synonyms of the same word to be provided, updating of a cluster of words around the selected word with new words, removing the word from or adding the word to a favorites list, and/or the like.

Embodiments of the present invention may provide a word cloud including a visual display of weighted words or text entries by popularity, probability, or other criteria. As such, in some situations, the user may select the next word without even having to enter a single text character. Moreover, the user may be provided with suggestions for words that may be used in a particular message, document, instruction, etc. In this regard, some embodiments, may be tied to a thesaurus or dictionary to provide vocabulary expansion opportunities to the user.

Figure 6:
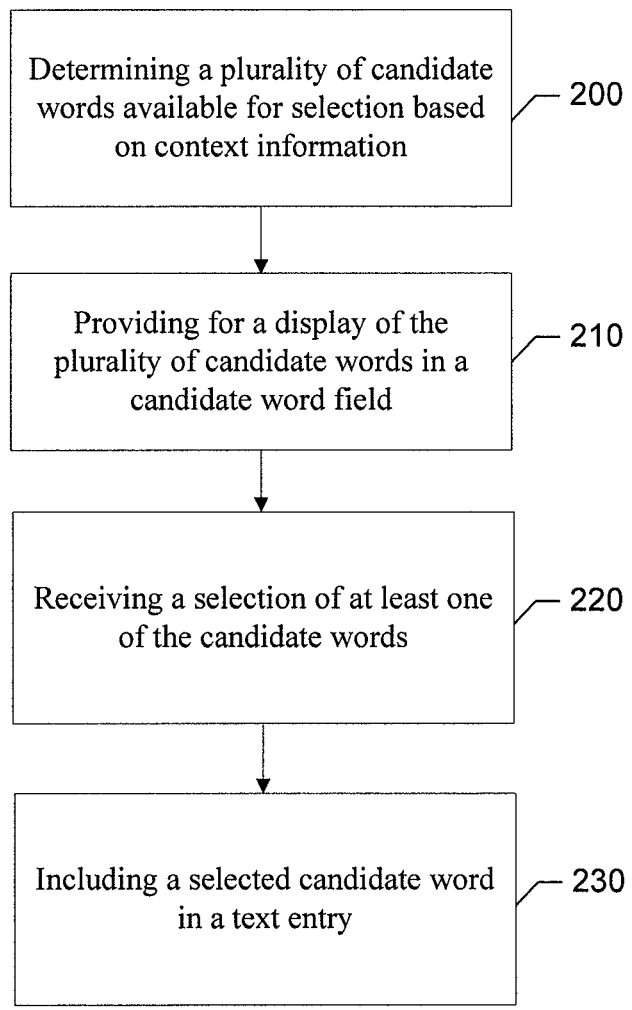
FIG. 6 is a flowchart according to an exemplary method for providing a word input mechanism according to an exemplary embodiment of the present invention.

FIG. 6 is a flowchart of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for providing a word input mechanism as illustrated, for example, in FIG. 6 may include determining a plurality of candidate words available for selection based on context information at operation 200. The context information could include information about a currently executed application, position within a document or message, a previous entry (word(s) or character(s)), time, date, and/or the like. As such, in some embodiments, determining the plurality of candidate words may include determining candidate words as a predetermined number of words having a probability of following a previous entry above a threshold or determining candidate words as a predetermined number of words having a probability of being used for a particular application above a threshold. The method may further include providing for a display of the plurality of candidate words in a candidate word field at operation 210. In some embodiments, providing for a display of the plurality of candidate words in the candidate word field may include providing for the display of the candidate words in a word cloud. The method may further include receiving a selection of at least one of the candidate words at operation 220 and including a selected candidate word in a text entry at operation 230. In an exemplary embodiment, receiving the selection of the at least one of the candidate words may include receiving an input defining a sequence of more than one selected candidate words.

In certain exemplary embodiments, the method may include further optional operations. For example, the method may further include modifying a display characteristic of each of the candidate words based on a probability associated with each corresponding one of the candidate words and/or updating a portion of the candidate words in the candidate word field after each selection (or based on another stimulus). In this regard, for example, updating the portion of the candidate words may include updating a portion of the candidate word field that is not proximate to the selected candidate word.

In an exemplary embodiment, a user interface is provided. The user interface may be generated in accordance with instructions stored in a computer readable storage medium. The user interface may include an input mechanism, a candidate word field and a text field. The input mechanism may be configured to receive an indication of a determination of a plurality of candidate words available for selection based on context information and to receive a selection of at least one of the candidate words. The candidate word field may be configured to define portion of a display for including the plurality of candidate words. The text field may be configured for including a selected candidate word in a text entry.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   determining, via a processor, a plurality of candidate words available for selection based on a present text entry position within a document or application and a previous text entry within the document or application;

causing a display of the plurality of candidate words in a candidate word field at a separate location from the document or application, wherein the candidate word field represents a positional format of the document or application, wherein the display of the candidate words in the candidate word field positions the candidate words within the candidate word field in a region of the candidate word field that is substantially similar to a position of a region of the document or application where the present text entry position is located;

receiving a selection of at least one of the candidate words within the candidate word field;

including a selected candidate word in the document or application; and causing the updating of a portion of the candidate words in the candidate word field after each selection.

2. A method according to claim 1, wherein determining the plurality of candidate words comprises determining candidate words as a predetermined number of words having a probability of following the previous text entry above a threshold.

3. A method according to claim 1, wherein determining the plurality of candidate words comprises determining candidate words as a predetermined number of words having a probability of being used for the document or application above a threshold.

4. A method according to claim 1, wherein causing a display of the plurality of candidate words in the candidate word field comprises causing the display of the candidate words in a word cloud separate from the document or application.

5. A method according to claim 1, further comprising modifying a display characteristic of each of the candidate words based on a probability associated with each corresponding one of the candidate words.

6. A method according to claim 1, wherein receiving the selection of the at least one of the candidate words comprises receiving an input defining a sequence of more than one selected candidate words.

7. A method according to claim 1, wherein causing the updating of the portion of the candidate words comprises causing updating of a portion of the candidate word field not containing the selected candidate word.

8. A non-transitory, computer-readable storage medium having computer-readable program code portions stored therein, the computer-readable program code portions comprising:

a first executable portion for determining a plurality of candidate words available for selection based on a present text entry position within a document or application and a previous text entry within the document or application;

a second executable portion for causing a display of the plurality of candidate words in a candidate word field at a separate location from the document or application, wherein the candidate word field represents a positional format of the document or application, wherein the display of the candidate words in the candidate word field positions the candidate words within the candidate word field in a region of the candidate word field that is substantially similar to a position of a region of the document or application where the present text entry position is located;

a third executable portion for receiving a selection of at least one of the candidate words within the candidate word field;

a fourth executable portion for including a selected candidate word in the document or application; and a fifth executable portion for causing the updating of a portion of the candidate words in the candidate word field after each selection.

9. A non-transitory, computer readable storage medium according to claim 8, wherein the first executable portion includes instructions for determining candidate words as a predetermined number of words having a probability of following the previous text entry above a threshold.

10. A non-transitory, computer readable storage medium according to claim 8, wherein the first executable portion includes instructions for determining candidate words as a predetermined number of words having a probability of being used for the document or application above a threshold.

11. A non-transitory, computer readable storage medium according to claim 8, wherein the second executable portion includes instructions for causing the display of the candidate words in a word cloud separate from the document or application.

12. A non-transitory, computer readable storage medium according to claim 8, further comprising a sixth executable portion for modifying a display characteristic of each of the candidate words based on a probability associated with each corresponding one of the candidate words.

13. A non-transitory, computer readable storage medium according to claim 8, wherein the third executable portion includes instructions for receiving an input defining a sequence of more than one selected candidate words.

14. A non-transitory, computer readable storage medium according to claim 8, wherein the fifth executable portion includes instructions for causing updating of a portion of the candidate word field not containing the selected candidate word.

15. An apparatus comprising a processor and a memory including computer program code, the memory and the computer program code configured to, with the processor, cause the apparatus at least to:

determine a plurality of candidate words available for selection based on, a present text entry position within a document or application and a previous text entry within the document or application;

cause a display of the plurality of candidate words in a candidate word field at a separate location from document or application, wherein the candidate word field represents a positional format of the document or application, wherein the display of the candidate words in the candidate word field positions the candidate words within the candidate word field in a region of the candidate word field that is substantially similar to a position of a region of the document or application where the present text entry position is located;

receive a selection of at least one of the candidate words within the candidate word field;

include a selected candidate word in the document or application; and cause the update of a portion of the candidate words in the candidate word field after each selection.

16. An apparatus according to claim 15, wherein the memory and computer program code are further configured to, with the processor, cause the apparatus to determine the plurality of candidate words by determining candidate words as a predetermined number of words having a probability of following the previous text entry above a threshold.

17. An apparatus according to claim 15, wherein the memory and computer program code are further configured to, with the processor, cause the apparatus to determine the plurality of candidate words by determining candidate words as a predetermined number of words having a probability of being used for the document or application above a threshold.

18. An apparatus according to claim 15, wherein the memory and computer program code are further configured to, with the processor, cause the apparatus to cause a display of the plurality of candidate words in the candidate word field by providing for the display of the candidate words in a word cloud separate from the document or application.

19. An apparatus according to claim 15, wherein the memory and computer program code are further configured to, with the processor, cause the apparatus to modify a display characteristic of each of the candidate words based on a probability associated with each corresponding one of the candidate words.

20. An apparatus according to claim 15, wherein the memory and computer program code are further configured to, with the processor, cause the apparatus to receive the selection of the at least one of the candidate words by receiving an input defining a sequence of more than one selected candidate words.

21. An apparatus according to claim 15, wherein the memory and computer program code are further configured to, with the processor, cause the apparatus to cause the update of the portion of the candidate words by causing updating of a portion of the candidate word field not containing the selected candidate word.

22. A non-transitory, computer readable storage medium having computer readable program code stored thereon for controlling a display to generate a user interface, the user interface comprising:
   a document or application configured for receiving a text entry at a text entry position and a selected candidate word;
   an input mechanism configured to receive an indication of a determination of a plurality of candidate words available for selection based on a present text entry position within the document or application and a previous text entry within the document or application and to receive a selection of at least one of the candidate words;
   a candidate word field configured to define a portion of a display for including the plurality of candidate words in the candidate word field at a separate location from the document or application, wherein the candidate word field represents a positional format of the document or application, wherein a portion of the candidate word field is configured to update after each selection of the at least one candidate word based at least in part on the selected candidate word, wherein the display of the candidate words in the candidate word field positions the candidate words within the candidate word field in a region of the candidate word field that is substantially similar to a position of a region of the document or application where the present text entry position is located.

* * * * *